Nov. 26, 1968    R. F. ANDERSON ET AL    3,412,766
FILLING MACHINE
Filed March 4, 1966    5 Sheets-Sheet 1

Inventors
Ralph F. Anderson
John H. Herbert
By McCanna, Morsbach & Pillote
Attys

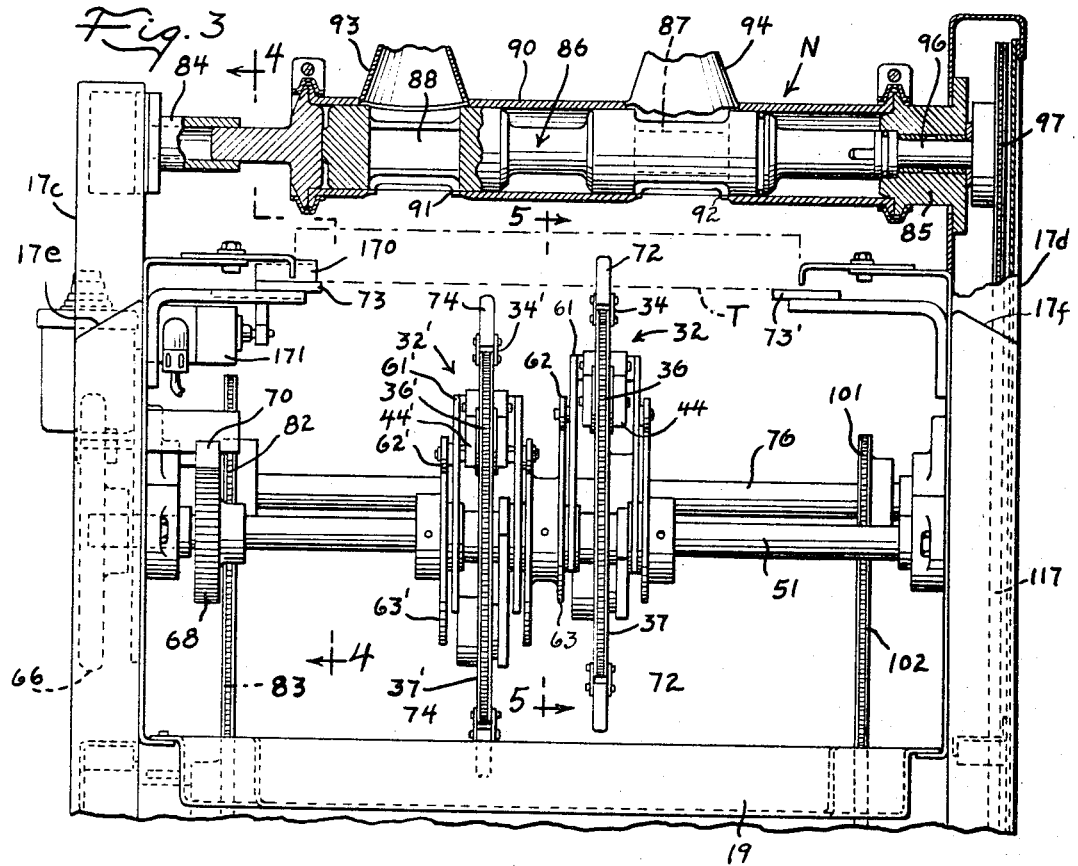
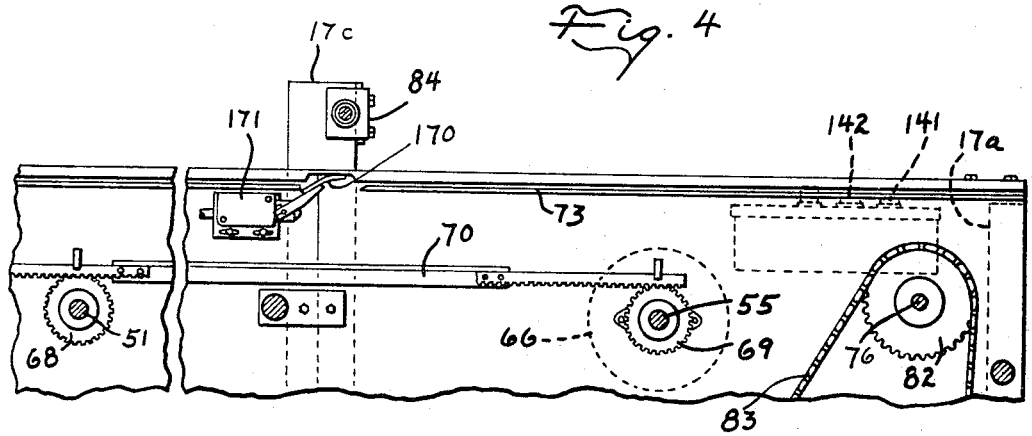

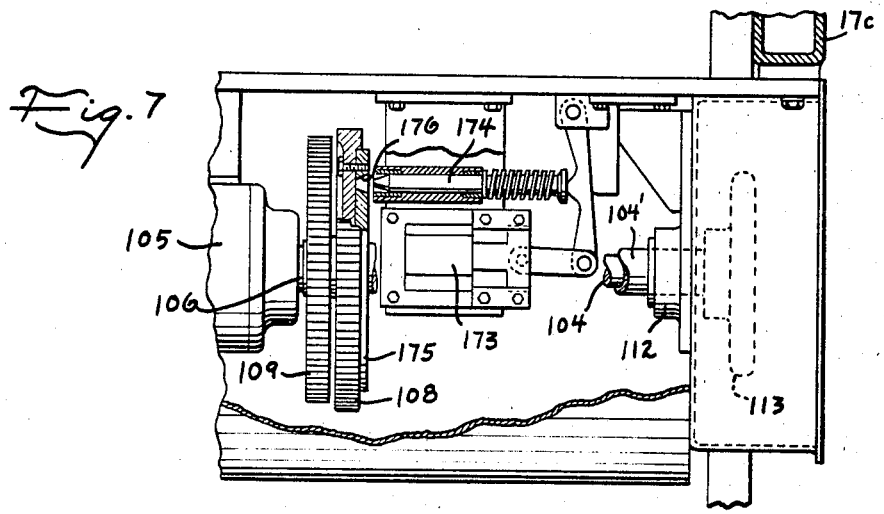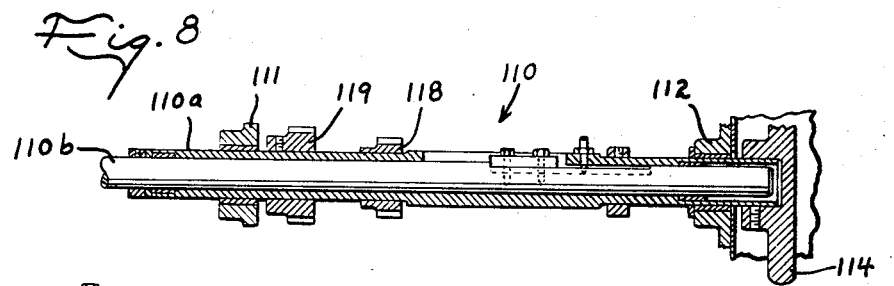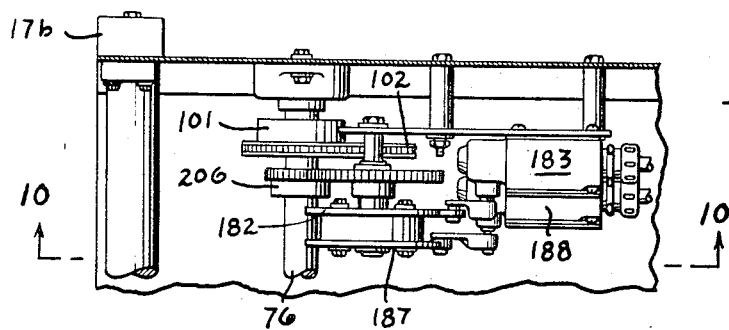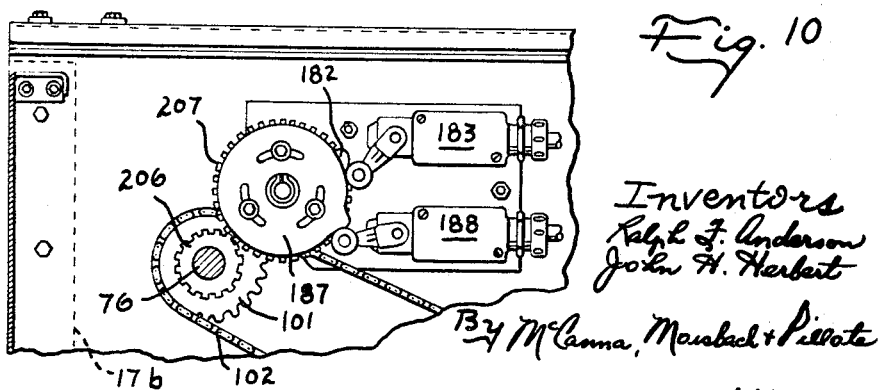

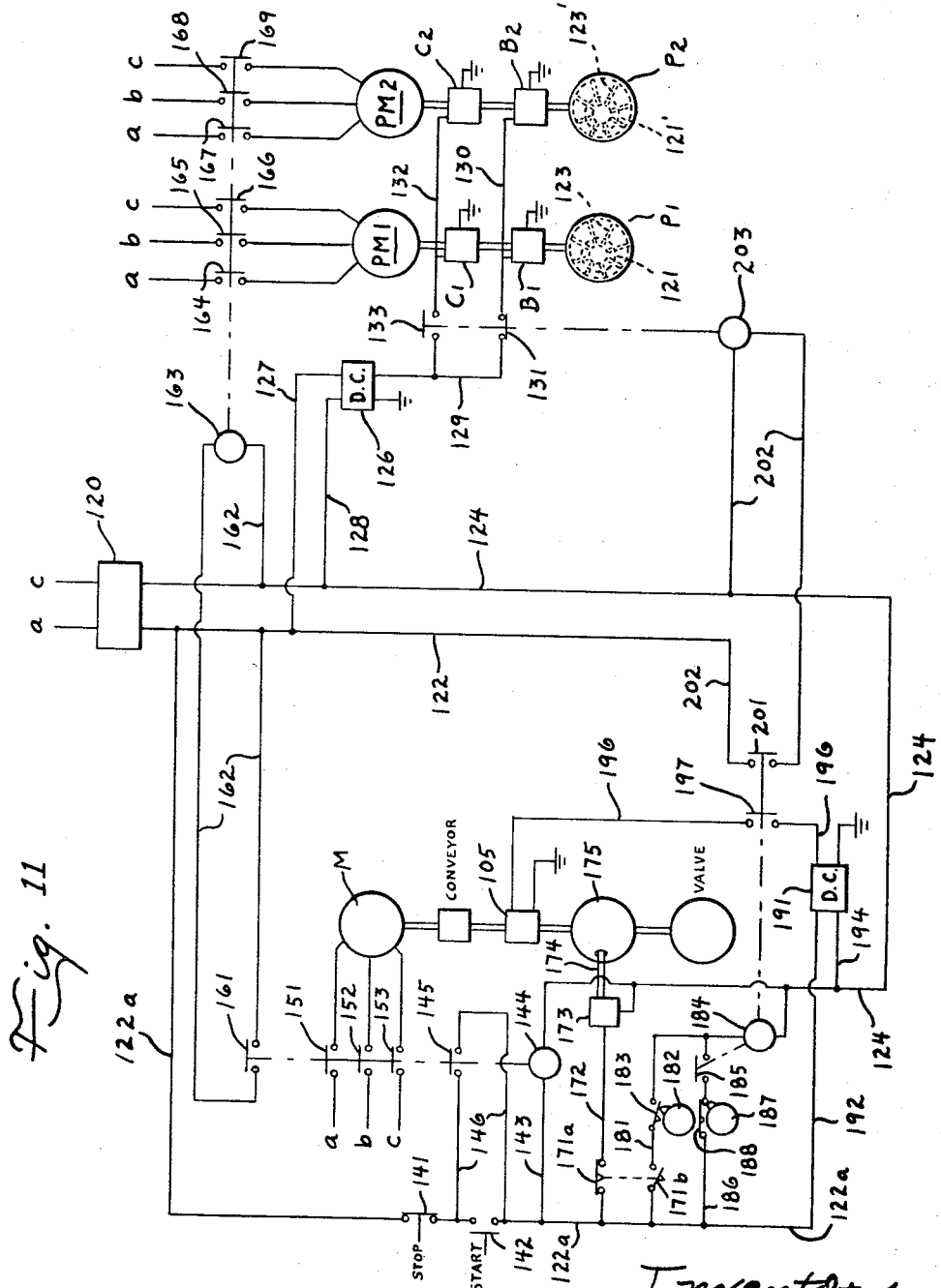

United States Patent Office 3,412,766
Patented Nov. 26, 1968

3,412,766
FILLING MACHINE
Ralph F. Anderson, 332 Calvin Park Blvd., Rockford, Ill. 61107, and John H. Herbert, Rockford, Ill.; said Herbert assignor to said Anderson
Filed Mar. 4, 1966, Ser. No. 531,804
11 Claims. (Cl. 141—161)

This invention relates generally to filling machines and more particularly to a filling machine for dispensing different quantities of material to different size or arranged receiving means.

It is an important object of this invention to provide a filling machine having dual conveyor means each of which is selectively usable.

Another object is to provide a filling machine in accordance with the above and having new and useful apparatus for selectively moving one conveyor means to operative position and the other to inoperative position.

Still another object is to provide a filling machine having a variable speed drive and a dispensing valve driven in timed relation to the conveyor means.

Yet another object of this invention is to provide a filling machine having a material pump and a dispensing valve which are simultaneously controlled for dispensing in response to presence of receiving means.

A further object of this invention is to provide a filling machine as above wherein the dispensing valve is arranged to dispense in a cycle of a plurality of discrete charges of material to each receiving means and which cycle is selectively changeable to vary the pulsations.

Other objects and advantages of this invention will become apparent as the same becomes better understood from the following detailed description taken in conjunction with the accompanying drawings wherein:

FIG. 3 is a partial end elevational view, as viewed from the right in FIG. 1, having portions of the nozzle and valves shown in section along line 3—3 of FIG. 2;

FIG. 4 is a sectional view taken generally along broken line 4—4 of FIG. 3;

Figure 6:
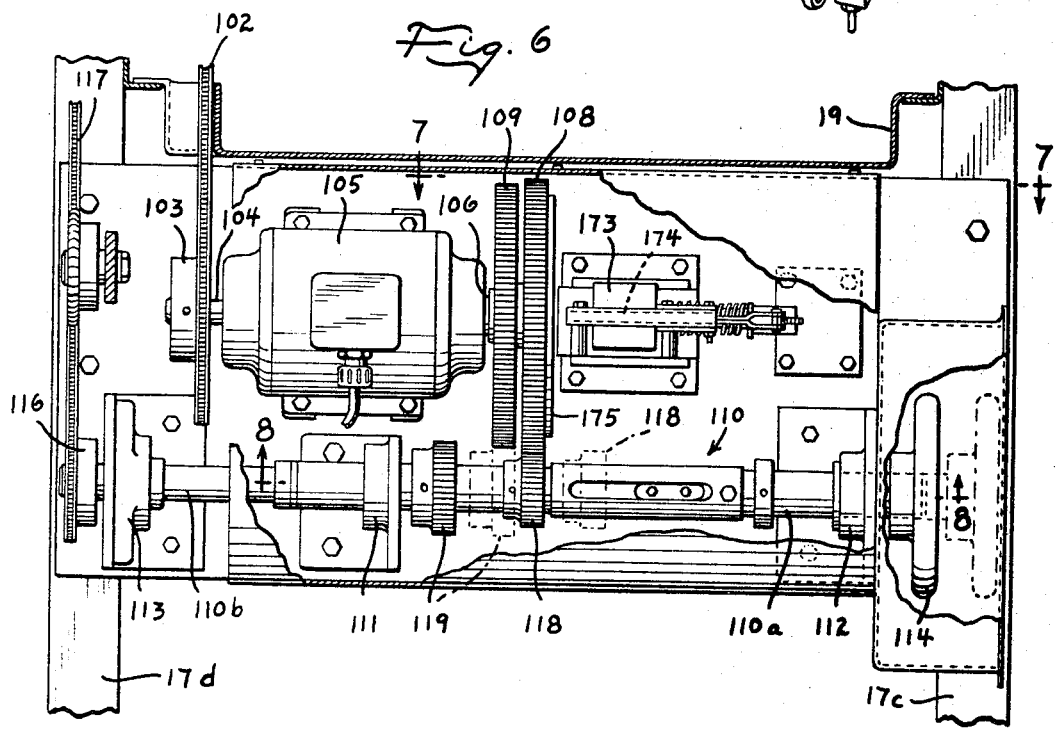
FIG. 6 is a fragmentary sectional view taken along line 6—6 of FIG. 2 and having portions broken away for better illustration.

FIGS. 7 and 8 are fragmentary sectional views taken along lines 7—7 and 8—8 of FIG. 6;

FIG. 9 is a top plan view of an area adjacent the left end of the machine and having a portion broken away to better illustrate the relationship of the parts;

FIG. 10 is a view taken along line 10—10 of FIG. 9; and

FIG. 11 is a schematic wiring diagram illustrating the controls for the filling machine.

Reference is now made more particularly to the drawings wherein similar reference characters indicate the same parts throughout the several views.

The machine, generally designated at 15 (FIG. 1), is illustrated as including a body or frame 16 supported by a plurality of legs 17a–17f. A housing 18 is also supported and provides a convenient enclosure for an operating and control mechanism hereinafter described. The machine is conveniently provided with a drip pan 19, supported as best shown in FIG. 3, to collect any spillage and to provide a top closure for the housing.

The machine is herein illustrated as being used to fill a plurality of receiving means, such as trays T. Each tray has a plurality of individual pans or receivers R conveniently arranged in two longitudinally extending rows along the tray. The machine has a nozzle and valve arrangement, generally designated N, for dispensing material to the receivers. Conduits 22 and 24 connect the nozzles to a supply S and pumps P1, P2 are interposed in the conduits for pumping the material from the supply to the nozzles in a manner hereinafter described. The machine has a novel arrangement for selective conversion to accommodate a different tray and receiver arrangement as will hereinafter become apparent. For example, the tray illustrated in FIG. 1 has seven inch diameter pans arranged in two lines of four each and the machine is selectively convertible to accommodate second trays (not shown) having eight inch diameter pans in two lines of three pans each.

In the embodiment illustrated, a longitudinally extending conveyor advances the trays past the nozzles in a generally horizontal plane. Preferably, there are two endless-type conveyors 32, 32' which are selectively movable into operative position to accommodate different size trays. Many parts of the conveyors are of similar construction and similar parts are indicated by the same numeral followed by a prime (') and a description for the first conveyor should be taken as descriptive of both conveyors. The first conveyor 32 includes an endless chain 34 entrained over sprockets 36, 37 (FIG. 5), sprockets 38, 39 (FIG. 2) and a driven sprocket 41 which is driven in a manner later described. Sprockets 36 and 38 are mounted adjacent opposite ends of a longitudinally extending support 43 and sprocket 36 is conveniently longitudinally adjustable by means of mounting 44, best shown in FIG. 5. Sprocket 37 is conveniently mounted on a laterally extending shaft 51 as by arm 52 and is resiliently urged into engagement with chain 34 by means of spring mounting 53 which extends from support 43 to arm 52. In a similar manner as shown in FIG. 2, sprocket 39 is mounted on laterally extending shaft 55 by means of arm 56 engaged by spring mounting 57.

Figure 5:
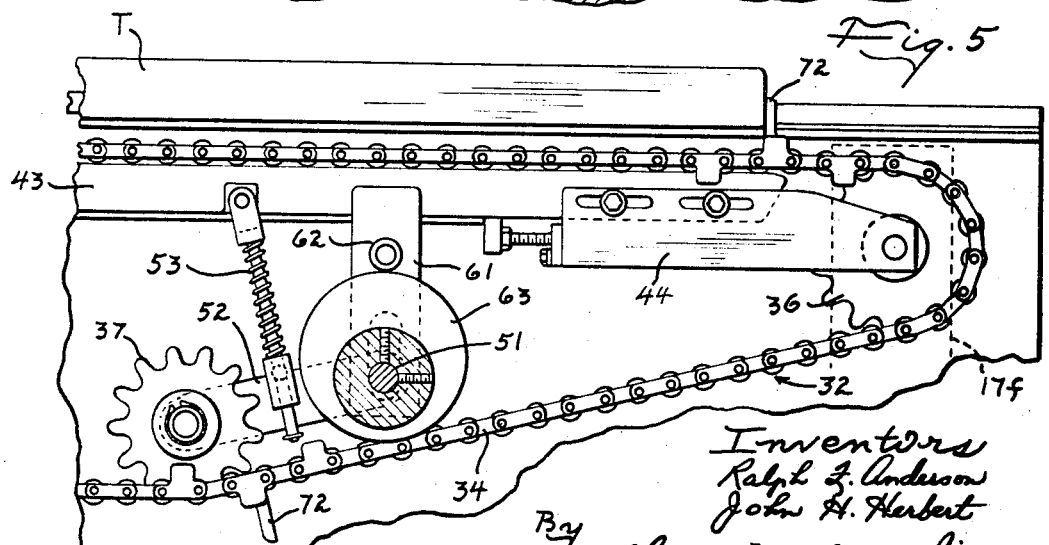
FIG. 5 is a fragmentary sectional view taken along line 5—5 of FIG. 3.

The support 43 which underlies the upper run of the conveyor is mounted for limited vertical movement relative to the shafts 51 and 55. As best shown in FIG. 5, a member 61 is secured to support 43 and has a vertically elongated slot which slidably receives the shaft 51. A cam follower 62 is secured to member 61 and engages a cam such as eccentric 63 which is mounted on shaft 51 for rotation therewith. As seen in FIG. 3, there is a similar cam and follower arrangement disposed on the opposite side of the chain 34 and support 43 to conveniently provide symmetrical movement as the conveyor is raised or lowered. As also illustrated in FIG. 3, there is a similar double cam and follower arrangement 63', 62' for conveyor 32' with the exception that the eccentric 63' is 180° out of phase with eccentric 63. In this manner, when shaft 51 is rotated, one end of one conveyor is raised while the corresponding end of the other is simultaneously lowered, and a similar arrangement is provided for raising and lowering the other ends of the conveyors.

Figure 2:
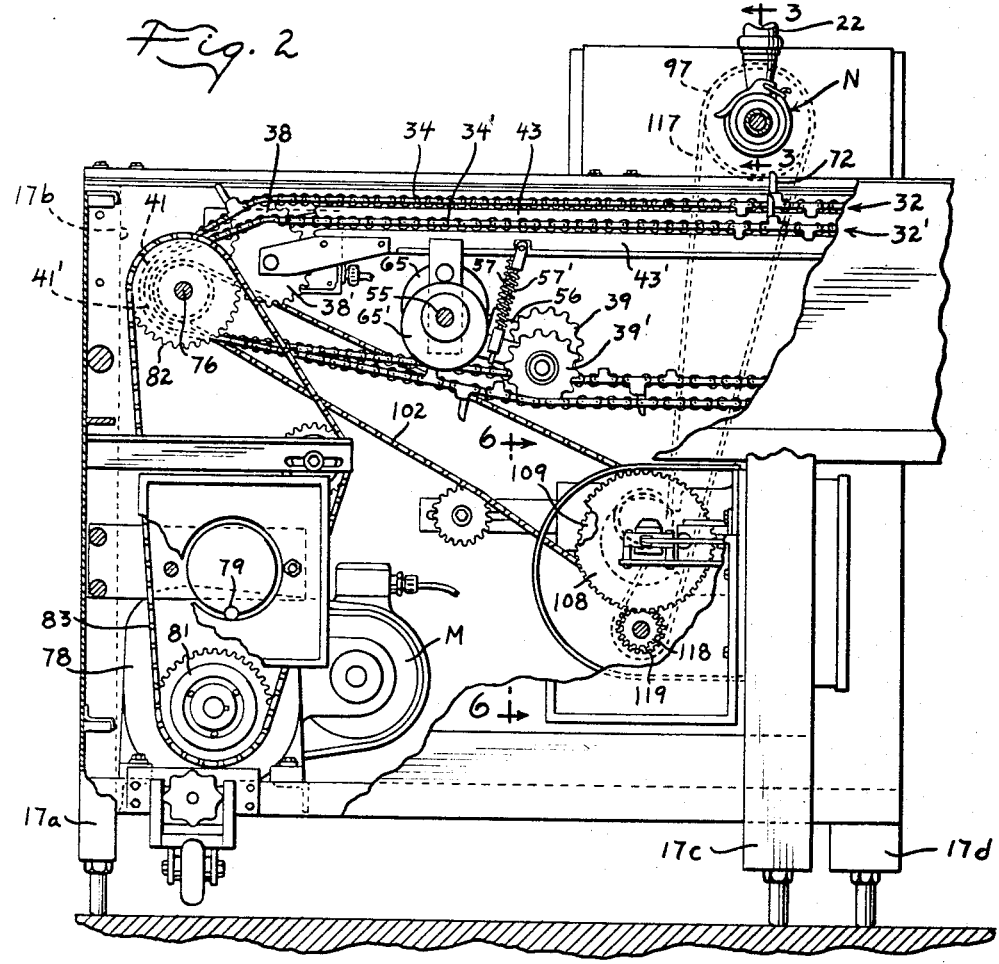
FIG. 2 is a partial front elevational view with portions broken away to better illustrate the relationship of the parts.

Attention is directed to FIG. 2 wherein is illustrated eccentrics 65 and 65' mounted on shaft 55. These eccentrics are associated with parts similar to those described in detail above and further description is deemed unnecessary. As illustrated, these eccentrics are also 180° out of phase and are arranged for rotation when shaft 55 is rotated. Shaft 55 conveniently extends to a point adjacent the side of the machine and a wheel 66 is attached to the extremity thereof. As illustrated in FIG. 4, pinion gears 68 and 69 are mounted on shafts 51 and 55, respectively, and are interconnected by rack 70. In this manner, when wheel 66 is rotated by an operator, shafts 51 and 55 are simultaneously rotated and one conveyor is raised while the other is simultaneously lowered.

The first conveyor 32 has a plurality of flights such as fingers 72 attached to the chain 34 at intervals approximating but greater than the length of tray T. Fingers 72 each have a height sufficient for engaging the back side of a tray T and operate to advance the tray along tracks 73, 73′ (FIG. 3) when the first conveyor is in raised or operative position shown. Similarly, second conveyor 32′ has a plurality of flights such as fingers 74 attached to chain 34′ and spaced apart a distance approximating but greater than the length of the second product tray (not shown) for advancing the same along the tracks when raised to operative position. As shown, the arrangement is such that either fingers 72 or 74 will pass beneath the product tray when its respective conveyor is in inoperative or lowered position.

As shown in FIG. 2, the conveyors are driven at relatively different speeds and the arangement is preferably such that the fingers 72 and 74 are coincident when passing underneath nozzle N. For this purpose, driven gears 41 and 41′ are aranged in a ratio to advance their respective chain a distance equal to the spacing of their respective fingers in relation to each other when the shaft 76 moves through a preselected angular distance. In other words, the cycle time or term for a product tray on either conveyor is the same for a given speed of shaft 76. Driven gears 41 and 41′ are mounted on driven shaft 76 (FIG. 2) which is driven by motor M. As illustrated in FIG. 2, motor M drives a variable speed drive 78 which has a control handle 79 conveniently disposed outside the housing to allow an operator to easily vary the speed of the machine. The variable speed drive drives shaft 76 through gears 81 and 82 and chain 83.

Figure 1:
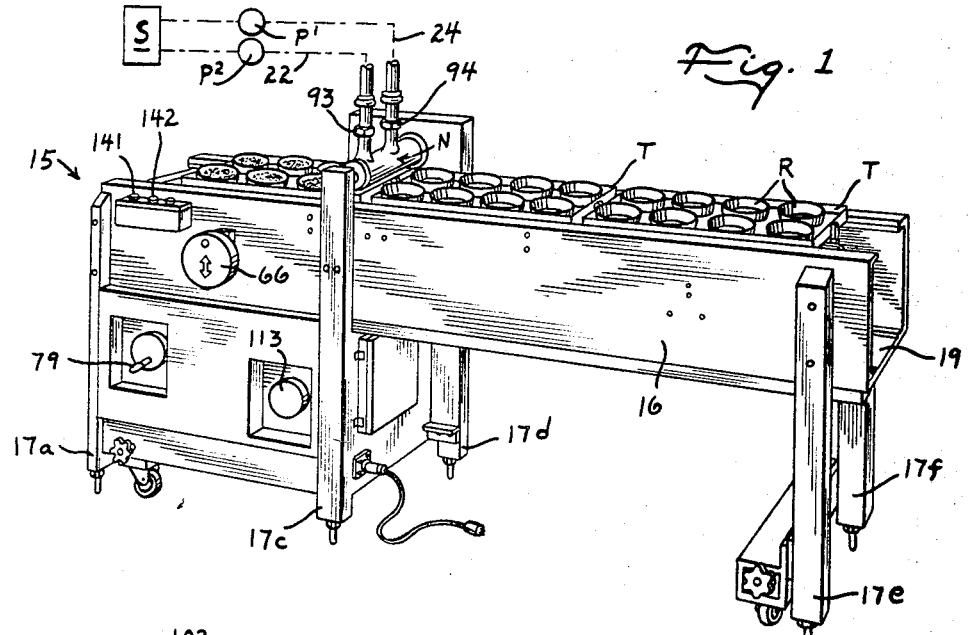
FIGURE 1 is a view, in part perspective and in part diagrammatic, of a filling machine constructed in accordance with the present invention.

The valve and nozzle arrangement N, is conveniently supported on legs 17c, and 17d as by support 84 and bearing 85, best illustrated in FIG. 3. Preferably, the arrangement N extends laterally of the conveyors and is disposed as close as practical to the upper surface of the pans. There is a laterally spaced nozzle 91 or 92 for each lateral row of pans. In the embodiment illustrated, the valve and nozzle ararngement includes a rotatable inner valve member 86 having discharge orifices 87 and 88 extending therethrough. An outer valve member 90 is disposed around the inner valve member and has downwardly opening delivery ports or nozzles 91 and 92 therein. Supply connections 93 and 94 extend upwardly from outer member 90 for connection to conduits 22 and 24, respectively (FIG. 1). While the other arrangements are possible, the supply connections are arranged approximately 180° from the delivery ports and, in this manner, discharge is advantageously controlled by rotation of the inner member 86. As can be seen, when the discharge orifices are rotated to communicate the delivery ports and the supply connections, there is flow of material through the delivery ports. In the embodiment illustrated, rotation of the inner member 90° interrupts the flow, and an additional 90° rotation again communicates the delivery ports and supply connections for discharge or dispensing of material. For this purpose, inner member 86 is connected to shaft 96 upon which is mounted sprocket 97 which is driven in a manner hereinafter described.

Inner member 86 is preferably driven in timed relation with the conveyor, and for this purpose, sprocket 101 is mounted on shaft 76 (FIG. 3) and a chain 102 extends from sprocket 101 to sprocket 103 mounted on shaft 104 extending from one side of clutch 105 (FIG. 6). Another clutch shaft 106 has gears 108 and 109 mounted thereon to be driven from the conveyor when the clutch is engaged. A transmission, generally designated 110, is disposed adjacent the periphery of gears 108, 109 and has gears 118, 119 selectively engageable with gears 108 and 109, respectively, the move position being shown in phantom in FIG. 6. This operates to selectively alter the number of rotations of inner member 86 as will become apparent. As best seen in FIG. 8, transmission 110 includes an outer tubular portion 110a, slidably supported on bearings 111 and 112, and an inner shaft 110b inside the tubular portion and supported by bearing 113 (FIG. 6). Tubular portion 110a is slidable upon shaft 110b and conveniently has its extremity outside the housing with a wheel 114 affixed to the extremity. In this manner, by movement of the wheel, gear 118 or 119 is selectively engageable to gear 108 or 109. Gear 97, associated with inner member 86 as described above, is driven by the transmission as by sprocket 116 and chain 117. In general, the nozzle is arranged to dispense a discrete charge of product each time inner member 86 is rotated through one-half revolution and the transmission is arranged to drive the valve through a number of half-revolutions corresponding to the number of receivers in a tray in the time that the tray moves past the nozzle. In the embodiment illustrated, tray T is provided with two lines of four receivers and the second size tray (not shown) has two lines of three receivers. For this purpose, gears 108 and 118 are proportioned to provide two revolutions of inner member 86 per cycle time of tray T and thus provide four discrete charges of product to the four receivers in each line. Gears 109 and 119 are proportioned to provide one and one-half revolutions of inner member 86, per cycle time, and thus three discrete charges of product.

Referring now to FIG. 11, there is diagrammatically illustrated ground line b and supply lines a and c which conveniently supply 440 volts to transformer 120, machine motor M, and pump motors PM1 and PM2. The pump motors respectively drive pumps P1 and P2 through clutches C1, C2 and each is provided with a brake B1 or B2. The pumps are preferably a positive displacement type and are illustrated as being of the vane-type, each having a rotor 121 disposed eccentrically of the pump housing and a plurality of vanes 123 which form a sliding seal between the rotor and the housing to withdraw the material from the supply S (FIG. 1) and feed the same under pressure to the nozzle and valve arrangement N. Each pump rotors 121, 121′ are driven by the respective pump motor advantageously through a variable speed drive (not shown).

When current is supplied to the transformer, 110 volts is supplied between supply line 122 and return line 124. A rectifier 126 is connected to the supply line by line 127 and to the return line by line 128. DC current is supplied from the rectifier to line 129. Brakes B1 and B2 are connected in parallel to line 130 which, in turn, is connected to line 129. DC current is applied through normally closed switch 131 to actuate the brakes and hold the pump rotors against rotation. This provides for prevention of oozing of material through the pumps in either direction when the pumps are not being driven. Clutches C1 and C2 are connected in parallel to line 132 which is also connected to line 129. A normally open switch is provided in line 132 to ordinarily prevent flow of DC current to the clutches.

A machine supply line 122a is connected to supply line 122 and a normally closed stop switch 141 and a normally open start switch 142 are interposed in line 122a. A convenient location of the start and stop switches on the machine is illustrated in FIG. 1. When the start switch is engaged, a circuit is completed from line 122a through line 143 and solenoid 144 to return line 124. The solenoid 144 when energized closes the normally open relay switch 145 which is connected in parallel with the start switch through line 146. This operates as a holding circuit for the relay to maintain the same energized when the start switch is released and to continuously supply current to the machine until the stop switch 141 is depressed. Simultaneously, solenoid 144 closes normally open switches 151, 152, and 153 disposed in lines a, b, and c, respectively, leading to machine motor M to start the machine motor. Also simultaneously, solenoid 144 operates to close normally open switch 161 interposed in line 162 which leads to solenoid 163. This actuates solenoid 163 which, in turn, closes normally open switches 164–169 and allows current to flow to pump motors PM1 and PM2.

A limit switch 171 is preferably arranged for engagement by advancing tray T and is located directly under nozzle N, as best seen in FIG. 4. Limit switch 171 includes switches 171a and 171b, shown in FIG. 11, which are operated together. When the machine is started, current is supplied through normally closed switch 171a and line 172 to solenoid 173. When no tray is present, normally closed switch 171a energizes solenoid 173 which operates to extend a pin 174 into engagement with a disk 175 mounted on gear 108, as best seen in FIG. 7. The disk has an opening 176 for receiving pin 174 and this operates to position gears 108 and 109 when clutch 105 is declutched at the end of a cycle. In this manner, the valve and nozzle arrangement is also positioned at the end of the cycle. When a tray is advanced by a conveyor, a finger 170 (FIG. 4) is depressed, closing normally open switch 171b in line 181 and simultaneously opening switch 171a. This operates to de-energize solenoid 173 and retract the pin to allow the valve to be driven when the clutch 105 is actuating. A first cam 182 is driven by the conveyor and operates to close normally open switch 183 in line 181 at the start of a cycle. In this manner, when switch 171b is actuated by a pan and switch 183 is closed by the cam, current is supplied to solenoid 184. The solenoid closes normally open holding switch 185 in line 186 and this operates to provide continuous flow of current to solenoid 184 until the end of the cycle, at which time second cam 187 operates to open normally closed switch 188 in line 186. If a second pan is then in position, another cycle is started.

Solenoid 184 also operates to engage clutch 105 and clutches C1 and C2 while disengaging brakes B1 and B2 through the arrangement described below. As illustrated, a rectifier 191 is connected to supply line 122a by line 192 and to return line 124 by line 194. DC current is supplied from the rectifier to line 196 which leads to clutch 105. A normally open switch 197 is interposed in line 196 to ordinarily de-actuate clutch 105. Solenoid 184 operates to close normally open switch 197 and supply current to clutch 115 thereby allowing the valve and nozzle arrangement to be rotated. Simultaneously, solenoid 184 closes normally open switch 201 interposed in line 202 which leads to solenoid 203 and back to return line 124. Solenoid 203 operates to simultaneously close normally open switch 133 thereby engaging clutches C1 and C2 as above described and simultaneously open normally closed switch 131 thereby releasing brakes B1 and B2.

As indicated above, switches 183 and 188 are actuated by cams 182 and 187, respectively, which are driven in timed relation to the conveyor. This arrangement is best illustrated in FIGS. 9 and 10 and the apparatus includes a gear 206 mounted on shaft 76 and which drives gear 207 on which the cams are attached. The arrangement is such that each cam makes one rotation per cycle which is also equal to the travel of one tray underneath the nozzles.

It is now deemed obvious that the present invention provides a filling machine having dual conveyor means each of which is selectively usable for advancing a tray beneath the nozzle and that the nozzle is associated with a rotary valve driven in timed relation with the conveyor through a clutch arrangement to stop the rotary valve if no pan is in position at the beginning of the cycle. It is further deemed obvious that the product pumps provide material to the nozzles and that the pumps are clutched and braked in response to the limit switch which also controls the valve rotation. This arrangement prevents build-up of pressure in the line during periods of time in which no product is being dispensed and also avoids the necessity of recirculation of the product.

While the preferred embodiment of the invention has been illustrated and described, this has been done by way of illustration and not limitation and it is desired that the invention not be limited except as required by the appending claims.

What is claimed is:

1. A filling machine including: a frame, discharge means for dispensing a material onto receiver means, means associated with the discharge means for supplying the material thereto, first conveyor means on the frame for advancing one receiver means having one size past the discharge means, second conveyor means on the frame for advancing another receiver means having another size past the discharge means, conveyor drive means operatively connected to the first and second conveyor means for driving the same, means operatively connected to the conveyor means for selectively moving one conveyor means to an operative position and for moving the other conveyor means to an inoperative position, and means for operating the discharge means correlative to the conveyor means which is in operative position.

2. A filling machine as set forth in claim 1 wherein the conveyor means are longitudinally extending and advance the receiver means past the discharge means in a generally horizontal plane, and wherein the means for moving the conveyor means moves one conveyor means upwardly to operative position and simultaneously moves the other conveyor means downwardly to inoperative position.

3. A filling machine as set forth in claim 2 wherein each conveyor means is in the form of an endless-type conveyor having first and second return termini, and including first and second members rotatably mounted on the frame and each adjacent a respective return terminus of the conveyor means, a pair of cam means mounted on each member and each engaging a respective conveyor means, means for simultaneously rotating the members, and said cam means simultaneously raising one conveyor means and lowering the other conveyor means as the members are rotated.

4. A filling machine as set forth in claim 1 wherein the first and second conveyor means each have flights spaced a distance approximately but larger than the size of their respective receiver means, the conveyor drive means drives the first conveyor means at one speed and the second conveyor means at a second speed, said speeds having a ratio equal to the ratio of the flight spacing, and an individual flight on the first conveyor means arranged to coincide with an individual flight on the second conveyor means as the individual flights move past the discharge means.

5. A filling machine as set forth in claim 1 wherein the discharge means includes rotatable valve means for controlling dispensing of the material, said valve means arranged for dispensing a discrete charge of material when rotated through a preselected angle, the receiver means each include a plurality of individual receivers and means for rotating said valve means through the preselected angle in the time for advancing an individual receiver past the discharge means thereby dispensing a discrete charge thereto.

6. A filling machine as set forth in claim 1 wherein the discharge means includes valve means for controlling dispensing of the material, and including means operatively connected to the valve means for selectively operating the valve means through one of a first and second cycle in timed relation to the conveyor means, said first and second cycle having a term generally equal to the time for respectively advancing said one and other receiver means past the discharge means, and means positioned for detecting the receiver means advancing past the discharge means and actuating said last-mentioned means in response thereto.

7. A filling machine as set forth in claim 6 wherein: the conveyor means are longitudinally extending, said one receiver means has a plurality of longitudinally arranged individual receivers, said other receiver means has a different plurality of longitudinally arranged individual receivers, the valve means is arranged for dispensing discrete charges of material, and said first and second cycles provide a plurality of discrete charges equal to the respective plurality of individual receivers of the one and other receiver means.

8. A filling machine as set forth in claim 7 wherein the valve means includes an inner valve member having discharge orifice means therein and an outer valve member disposed around the inner valve member and having delivery port means therein, one of said valve members rotatable relative to the other member and arranged to communicate the port means and orifice means during rotation to provide dispensing of discrete charges of material, and wherein the means operatively connected to the valve means includes positive drive means connected to said one valve member for rotating the same in timed relation to the conveyor means.

9. A filling machine as set forth in claim 8 wherein the means positioned for detecting the receiver means and actuating the positive drive means includes a switch for detecting the receiver means, a clutch operatively connected to the positive drive means and the conveyor drive means and responsive to the switch for interconnecting said drive means when a receiver means engages the switch and for declutching when no receiver means is present, and means for engaging the positive drive means when the clutch is disengaged to position the same for a succeeding cycle.

10. A filling machine as set forth in claim 6 wherein the means for supplying the material includes pump means for delivering the material to the discharge means, and including means responsive to the means for detecting the receiver means for starting the pump means when a receiver means is advanced past the discharge means.

11. A filling machine as set forth in claim 9 wherein the means for supplying the material includes pump means for delivering the material to the discharge means, and including means responsive to the switch for starting the pump means when a receiver means engages the switch and for stopping the pump means when no receiver means is present.

References Cited

UNITED STATES PATENTS 3,330,311   7/1967   Christine et al. _____ 141—167

LAVERNE D. GEIGER, *Primary Examiner.*

E. J. EARLS, *Assistant Examiner.*